United States Patent
Ansley

(10) Patent No.: US 8,379,660 B2
(45) Date of Patent: Feb. 19, 2013

(54) METHOD AND SYSTEM FOR SELECTING FROM A PLURALITY OF CONFIGURATION PROFILE RECORDS FOR CHANNEL BONDING OPERATION

(75) Inventor: Carol Ansley, Johns Creek, GA (US)

(73) Assignee: ARRIS Group, Inc., Suwanee, GA (US)

( * ) Notice: Subject to any disclaimer, the term of this patent is extended or adjusted under 35 U.S.C. 154(b) by 0 days.

(21) Appl. No.: 12/259,295

(22) Filed: Oct. 27, 2008

(65) Prior Publication Data

US 2009/0135846 A1 May 28, 2009

Related U.S. Application Data

(60) Provisional application No. 60/982,660, filed on Oct. 25, 2007.

(51) Int. Cl.
*H04L 12/28* (2006.01)
(52) U.S. Cl. ........ 370/431; 370/329; 370/230; 370/468; 725/111
(58) Field of Classification Search .................. 370/431, 370/329, 230, 230.1, 468; 725/111
See application file for complete search history.

(56) References Cited

U.S. PATENT DOCUMENTS

| 6,891,858 B1* | 5/2005 | Mahesh et al. ................ 370/480 |
| 6,898,755 B1* | 5/2005 | Hou ............................. 714/784 |
| 7,549,156 B2* | 6/2009 | Li et al. ........................ 725/111 |
| 2005/0025145 A1* | 2/2005 | Rakib et al. ................... 370/389 |
| 2005/0122996 A1* | 6/2005 | Azenkot et al. ............... 370/477 |
| 2005/0232294 A1* | 10/2005 | Quigley et al. ............... 370/436 |

* cited by examiner

*Primary Examiner* — Kibrom T Hailu
(74) *Attorney, Agent, or Firm* — Troy A. Van Aacken; Robert J. Starr

(57) ABSTRACT

In DOCSIS 3.0 a greater level of configuration is possible for cable modems than was available in earlier versions. The CMTS potentially receives many possible configurations from a new CM. The standard does not indicate how the CMTS should configure a CM that can support more than one possible configuration. A CMTS' operator specifies preferences for certain channel configurations. The CMTS evaluates the configuration profiles received from a booting CM and determines the best profile to attempt to accommodate based on the specified preferences. The CMTS determines how to instruct the CM to configure itself based on the available channel resources than can accommodate the selected configuration profile.

6 Claims, 1 Drawing Sheet

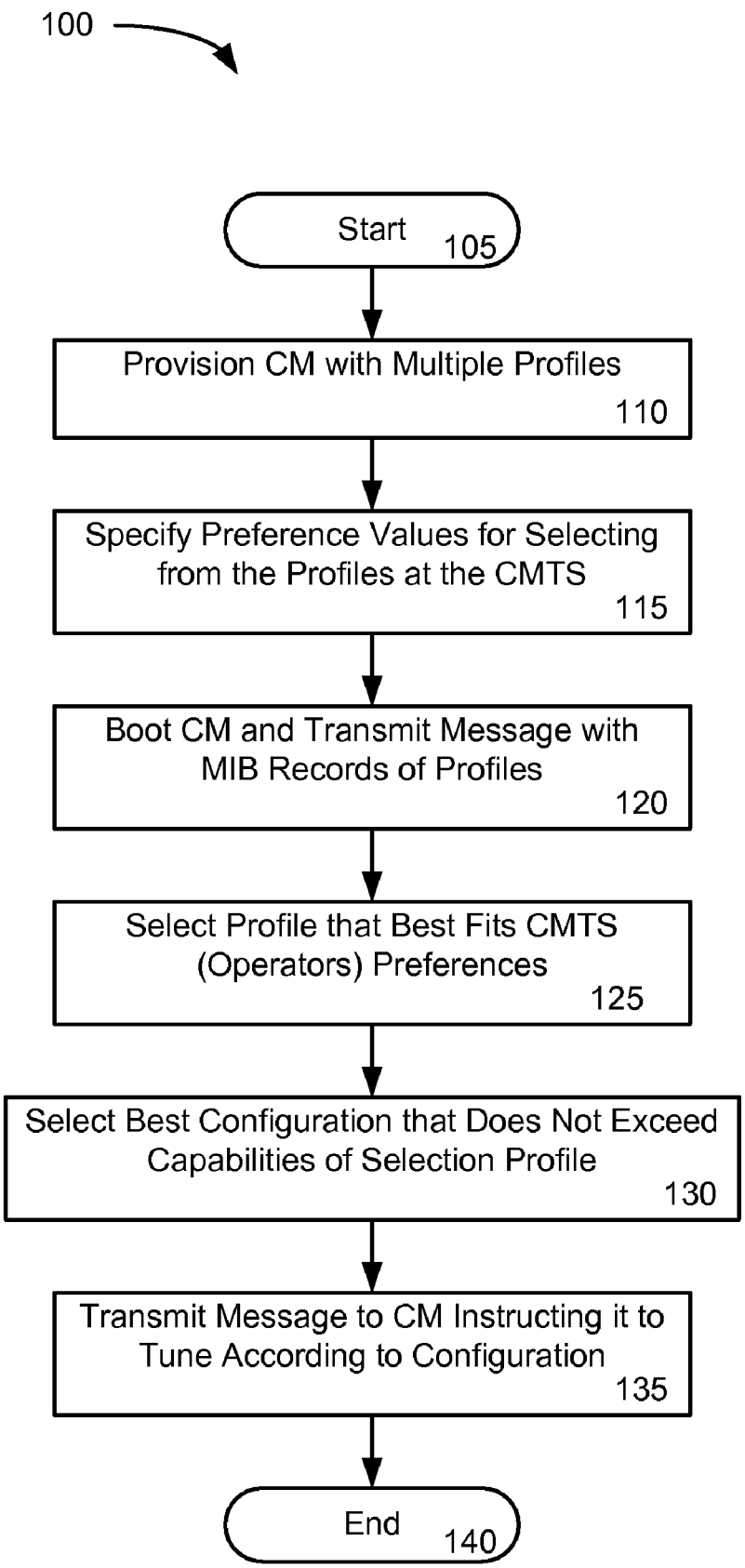

METHOD AND SYSTEM FOR SELECTING FROM A PLURALITY OF CONFIGURATION PROFILE RECORDS FOR CHANNEL BONDING OPERATION

CROSS REFERENCE TO RELATED APPLICATION

This application claims priority under 35 U.S.C. 119(e) to U.S. provisional patent application No. 60/982,660 entitled "Downstream channel bonding," which was filed Oct. 25, 2007, and is incorporated herein by reference in its entirety.

TECHNICAL FIELD

The claimed subject matter relates to communications networks, and more particularly, to provisioning tables for cable modems.

BACKGROUND

Channel bonding is a technique used to combine the available bandwidth of several Data Over Cable Interface Specification ("DOCSIS") channels into a single larger logical pipe. This development began as the multiple systems operators ("MSOs"), (i.e., cable television companies) saw advantages for their networks in deploying this technology which allows better theoretical bandwidth usage and allows higher net throughput to their subscribers. DOCSIS version 3.0 specifies channel bonding methodologies for upstream and downstream links over the hybrid fiber coaxial network ("HFC"). These new features allow individual subscribers to get higher data throughput and provides an improvement for bandwidth efficiency through the effective aggregation of multiple upstream and downstream channels into a single logical flow.

DOCSIS 3.0 specifies many changes to cable modem termination system ("CMTS") and cable modem ("CM") provisioning, particularly with respect to network configuration. MSO personnel assign bonding groups of channels manually or automatically within the CMTS, with individual service flows automatically assigned within the available bonding groups. A cable modem has been provisioned with multiple configuration profile records, wherein a record indicates a CM's physical capabilities, (e.g., number of channels it can support, and the spacing between channels) such as management information base ("MIB") records. But, a CMTS may not be able to intelligently determine from among the plurality of records it receives when a CM boots up which profile record to select. Furthermore, a CMTS cannot determine automatically how to configure, or allocate, the channels available to support the CM booting up. Thus, there is a need in the art for a method and system for selecting from among a plurality of CM profile records a profile a CMTS should use. The art also needs a method for automatically determining which configuration of channels to use in communicating with the CM.

DESCRIPTION OF THE DRAWINGS

FIG. 1 illustrates a flow diagram of a method of selecting a profile and a channel bonding configuration to use with a communication device.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations, variations, modifications and equivalent arrangements, the present invention being limited only by the claims appended hereto and the equivalents thereof.

Turning now to the figures, FIG. 1 illustrates a flow diagram of a method 100 of selecting a profile and a channel bonding configuration to use with a communication device, such as a cable modem. Method 100 begins at step 105. A manufacturer, typically, provisions a cable modem with one or more profile records indicating various parameters of setup capabilities at step 110. The parameters may include number of upstream channels, number of downstream channels, spacing between channels, whether all channels should be centered within a predetermined range, or whether some channels can be spaced so that they do not fall within a particular range.

At step 115, an MSO's personnel specifies preferences for the various parameters that a cable modem can typically support. For example, the MSO may specify that more weight should be given to number of channels used to transmit, or receive, a traffic flow. Or, the MSO may specify that it prefers to use multiple channels used in channel bonding centered with a predetermined range, for example 60 MHz. With respect to the latter example, a first cable modem profile received from a CM booting up at step 120 may indicate using eight channels spaced within a 100 MHz range. A second profile MIB from the same CM may specify using four channels, but all within 60 MHz. The CMTS would select the second profile at step 125 for use in determining its channel assignment, or configuration.

At step 130, the CMTS selects the best configuration it can based on the profile it selected at step 125, and its available channel resources. Continuing with the example above, the CMTS selects the second profile at step 125 and chooses four channels having center frequencies within 60 MHz of each other to assign to the CM that is booting up and requesting channel assignments at step 120. The CMTS sends a channel assignment message to the booting CM at step 135 instructing it to adjust its tuners and modulators, either for upstream transmit or downstream receive, according to the configuration selected at step 135. Method 100 ends at step 140.

If the CMTS only has three channels available, it will assign them even though the preferred profile MIB selected at step 125 indicates that the CM can communicate using four channels. However, if the CMTS has 8 channels it could assign to channel bonding communication with the CM, it will only assign four, because the profile selected at step 125 indicates the CM only supports four channel communication where the channels fall within 60 MHz.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A method for determining channels to use in channel bonding communication with a cable modem, comprising:

specifying cable modem termination system preferences for certain parameters of cable modem channel assignment over other parameters, wherein the preferences include two or more of: a number of upstream channels, number of downstream channels, spacing between channels, whether all channels should be centered within a predetermined range, or whether some channels can be spaced so that they do not fall within a particular range;

receiving a plurality of profiles from a single cable modem during bootup that each indicate a different channel bonding arrangement for that single cable modem;

comparing the plurality of profiles associated with the single cable modem to the specified cable modem termination system preferences;

selecting one of the plurality of profiles based on the specified cable modem termination system preferences for certain parameters over other parameters;

assigning channels for communication with the single cable modem based on the selected profile; and transmitting a message containing an instruction to the single cable modem based on the selected profile instructing the single cable modem how to tune its circuitry based on the assigned channels.

2. The method of claim 1 wherein the received profile comprises a receive channel profile.

3. The method of claim 1 wherein the received profile comprises a transmit channel profile.

4. The method of claim 1, wherein the received profile comprises a fixed receive channel configuration profile.

5. The method of claim 1, wherein the specified preferences are indicated by means of integer weighting priorities.

6. The method of claim 1, wherein personnel selects generic preferred configuration attributes that are translated into receive channel profile attributes.

* * * * *